US012713477B2

(12) United States Patent
Chandrashekar et al.

(10) Patent No.: US 12,713,477 B2
(45) Date of Patent: Aug. 18, 2026

(54) DATA TRANSMISSION IN INACTIVE STATE CONNECTION

(71) Applicant: Nokia Technologies Oy, Espoo (FI)

(72) Inventors: Subramanya Chandrashekar, Bangalore (IN); Srinivasan Selvaganapathy, Bangalore (IN); Philippe Godin, Massy (FR); Daniela Laselva, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 297 days.

(21) Appl. No.: 18/551,113

(22) PCT Filed: Mar. 8, 2022

(86) PCT No.: PCT/EP2022/055866
§ 371 (c)(1),
(2) Date: Sep. 18, 2023

(87) PCT Pub. No.: WO2022/200033
PCT Pub. Date: Sep. 29, 2022

(65) Prior Publication Data

US 2024/0172300 A1 May 23, 2024

(30) Foreign Application Priority Data

Mar. 26, 2021 (IN) ............................ 202141013496

(51) Int. Cl.
*H04W 76/12* (2018.01)
*H04W 76/27* (2018.01)

(52) U.S. Cl.
CPC .......... *H04W 76/12* (2018.02); *H04W 76/27* (2018.02)

(58) Field of Classification Search
CPC ............................ H04W 76/12; H04W 76/27
See application file for complete search history.

(56) References Cited

U.S. PATENT DOCUMENTS 12,543,174 B2 * 2/2026 Lin .................. H04W 72/1268
2019/0159260 A1 5/2019 Charbit et al.
(Continued)

FOREIGN PATENT DOCUMENTS

EP 3869907 A1 8/2021
WO 2018/062957 A1 4/2018
(Continued)

OTHER PUBLICATIONS

"3rd Generation Partnership Project; Technical Specification Group Radio Access Network; NG-RAN; Architecture description (Release 16)", 3GPP TS 38.401, V16.3.0, Sep. 2020, pp. 1-78.
(Continued)

*Primary Examiner* — Redentor Pasia
(74) *Attorney, Agent, or Firm* — Lippes Mathias LLP

(57) ABSTRACT

The present subject matter relates to a user equipment for transmission of a data, the user equipment being served by a cell of a base station, the user equipment being in an inactive state, the user equipment comprising means being configured for: in response to determining that a condition is fulfilled, forming a data packet comprising the data and a first identity of the user equipment; otherwise, forming a data packet comprising the data and a second identity of the user equipment; wherein the condition comprises at least that the cell was a last serving cell of the user equipment before the user equipment transitioned to the inactive state; wherein the first identity is different from the second identity; transmitting the data packet to the base station.

10 Claims, 6 Drawing Sheets

(56) References Cited

U.S. PATENT DOCUMENTS

2020/0137760 A1 4/2020 Shih et al.
2020/0351782 A1 11/2020 Kubota et al.
2021/0014926 A1* 1/2021 Xu ........................ H04W 76/27
2021/0314912 A1* 10/2021 He .................... H04W 52/0216
2021/0314979 A1* 10/2021 Agiwal ................. H04L 5/0032
2022/0286960 A1* 9/2022 Åström ................. H04W 88/06
2023/0164773 A1* 5/2023 Alfarhan ........... H04W 74/0833 370/329
2023/0179361 A1* 6/2023 Zou ....................... H04L 5/0048 370/329
2024/0015689 A1* 1/2024 Tseng ................ H04W 74/0833
2024/0040626 A1* 2/2024 Tseng .................. H04W 72/542
2024/0373357 A1* 11/2024 Kubota ............. H04W 52/0229
2025/0024551 A1* 1/2025 Xu ........................ H04W 76/27

FOREIGN PATENT DOCUMENTS

WO 2019/194486 A1 10/2019
WO 2020/032659 A1 2/2020
WO 2020/088097 A1 5/2020

OTHER PUBLICATIONS

"3rd Generation Partnership Project; Technical Specification Group Radio Access Network; NG-RAN; E1 Application Protocol (E1AP) (Release 16)", 3GPP TS 38.463, V16.3.0, Sep. 2020, pp. 1-235.

"3rd Generation Partnership Project; Technical Specification Group Radio Access Network; NG-RAN; F1 application protocol (F1AP) (Release 16)", 3GPP TS 38.473, V16.3.1, Oct. 2020, pp. 1-455.

"Work Item on NR smalldata transmissions in Inactive state", 3GPP TSG RAN Meeting #86, RP-193252, Agenda Item: 9.1.2, ZTE Corporation, Dec. 9-12, 2019, 4 pages.

"SDT mechanism on RRC/non-RRC based approaches and RACH requirements", 3GPP TSG RAN WG2 Meeting #111-e, R2-2006713, Agenda item: 8.6.2, Intel Corporation, Aug. 17-28, 2020, 10 pages.

"Radio bearer configuration for SDT considering UE context relocation and CU/DU split", 3GPP TSG RAN WG2 Meeting #111-e, R2-2006714, Agenda item: 8.6.2, Intel Corporation, Aug. 17-28, 2020, 6 pages.

"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321, V16.2.0, Sep. 2020, pp. 1-141.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.2.1, Sep. 2020, pp. 1-1081.

"3rd Generation Partnership Project; Technical Specification Group Radio Access Network; Evolved Universal Terrestrial Radio Access (E-UTRA); Physical layer procedures (Release 16)", 3GPP TS 36.213, V16.3.0, Sep. 2020, 577 pages.

Ren et al., "Give me a hint: An ID-free small data transmission protocol for dense IoT devices", IFIP Wireless Days, WD, Mar. 29-31, 2017, pp. 121-126.

International Search Report and Written Opinion received for corresponding Patent Cooperation Treaty Application No. PCT/EP2022/055866, dated Jun. 1, 2022, 17 pages.

"General considerations on design principles of data transmission in inactive", 3GPP TSG-RAN WG2 Jan. 2017 NR Ad-hoc Meeting , R2-1700367, Agenda item: 3.2.2.2, Samsung, Jan. 17-19, 2017, pp. 1-3.

"Further considerations of random access in NR", 3GPP TSG-RAN WG2 97 meeting, R2-1701721, Agenda item: 10.2.1.4, Intel Corporation, Feb. 13-17, 2017, pp. 1-4.

"UL data transmission in RRC_Inactive", 3GPP TSG-RAN WG2 NR Ad Hoc, R2-1700288, Agenda item: 3.2.2.2, LG Electronics Inc., Jan. 17-19, 2017, pp. 1-3.

* cited by examiner

DATA TRANSMISSION IN INACTIVE STATE CONNECTION

RELATED APPLICATION

This application was originally filed as PCT Application No. PCT/EP2022/055866, filed on Mar. 8, 2022, which claims priority from Indian Application No. 202141013496, filed on Mar. 26, 2021, each of which is incorporated herein by reference in its entirety.

TECHNICAL FIELD

Various example embodiments relate to telecommunication systems, and more particularly to data transmission in an inactive state connection.

BACKGROUND 5G refers to a new generation of radio systems and network architecture. 5G is expected to provide higher bitrates and coverage than the current long term evolution (LTE) systems. However, there is a continuous need to improve the efficiency of resource usage of these systems.

SUMMARY

Example embodiments provide a user equipment for transmission of data, the user equipment being served by a cell of a base station, the user equipment being in an inactive state, the user equipment comprising means being configured for: in response to determining that a condition is fulfilled, forming a data packet comprising the data and a first identity of the user equipment, otherwise, forming a data packet comprising the data and a second identity of the user equipment, wherein the condition comprises at least that the cell was a last serving cell of the user equipment before the user equipment transitioned to the inactive state, wherein the first identity is different from the second identity, transmitting the data packet to the base station.

Example embodiments provide a base station for configuring a user equipment that is transiting into an inactive state, the base station comprising means being configured for: determining whether a frequency of cell change by the user equipment is lesser than a predefined threshold, in response to determining that the frequency of cell change is lesser than the predefined threshold, creating a first identity, wherein the first identity comprises an identifier of the user equipment which uniquely identifies the user equipment in a cell currently serving the user equipment, creating a second identity, wherein the second identity comprises an identifier of the user equipment and an identifier of, the base station or an element of the base station, configuring the user equipment with the created identities to be used for data transmission in inactive state and in order to enable identification of a user equipment context of the user equipment in inactive state of connection.

Example embodiments provide a computer program product, said computer program product comprising a computer readable storage medium having stored thereon a user equipment identity, named SDT-I-RNTI, for identification of a user equipment context of the user equipment in inactive state of connection, the user equipment identity consisting of an identifier of the user equipment.

Example embodiments provide a method used in a user equipment for transmission of data, the user equipment being served by a cell of a base station, the user equipment being in an inactive state of connection, the method comprising: in response to determining that a condition is fulfilled, forming a data packet comprising the data and a first identity of the user equipment, otherwise, forming a data packet comprising the data and a second identity of the user equipment, wherein the condition comprises at least that the cell was a last serving cell of the user equipment before the user equipment transitioned to the inactive state, wherein the first identity is different from the second identity, transmitting the data packet to the base station.

Example embodiments provide a computer program comprising instructions for causing a user equipment for performing at least the following: in response to determining that a condition is fulfilled, forming a data packet comprising data and a first identity of the user equipment, otherwise, forming a data packet comprising the data and a second identity of the user equipment, wherein the condition comprises at least that a current serving cell was a last serving cell of the user equipment before the user equipment transitioned to the inactive state, wherein the first identity is different from the second identity, transmitting the data packet to the base station.

Example embodiments provide a method used in a base station for configuring a user equipment that is transiting into an inactive state of connection, the method comprising: determining whether a frequency of cell change by the user equipment is lesser than a predefined threshold, in response to determining that the frequency of cell change is lesser than the predefined threshold, creating a first identity, wherein the first identity comprises an identifier of the user equipment which uniquely identifies the user equipment in a cell currently serving the user equipment, creating a second identity, wherein the second identity comprises an identifier of the user equipment and an identifier of the base station or of an element of the base station, configuring the user equipment with the created identities to be used for data transmission in inactive state and in order to enable identification of a user equipment context of the user equipment in inactive state of connection.

Example embodiments provide a computer program comprising instructions for causing a base station for performing at least the following: determining whether a frequency of cell change by a user equipment is lesser than a predefined threshold, in response to determining that the frequency of cell change is lesser than the predefined threshold, creating a first identity, wherein the first identity comprises an identifier of the user equipment which uniquely identifies the user equipment in a cell currently serving the user equipment, creating a second identity, wherein the second identity comprises an identifier of the user equipment and an identifier of the base station or of an element of the base station, configuring the user equipment with the created identities to be used for data transmission in inactive state and in order to enable identification of a user equipment context of the user equipment in inactive state of connection.

BRIEF DESCRIPTION OF THE DRAWINGS

The accompanying figures are included to provide a further understanding of examples, and are incorporated in and constitute part of this specification. In the figures.

DETAILED DESCRIPTION

Figure 1:
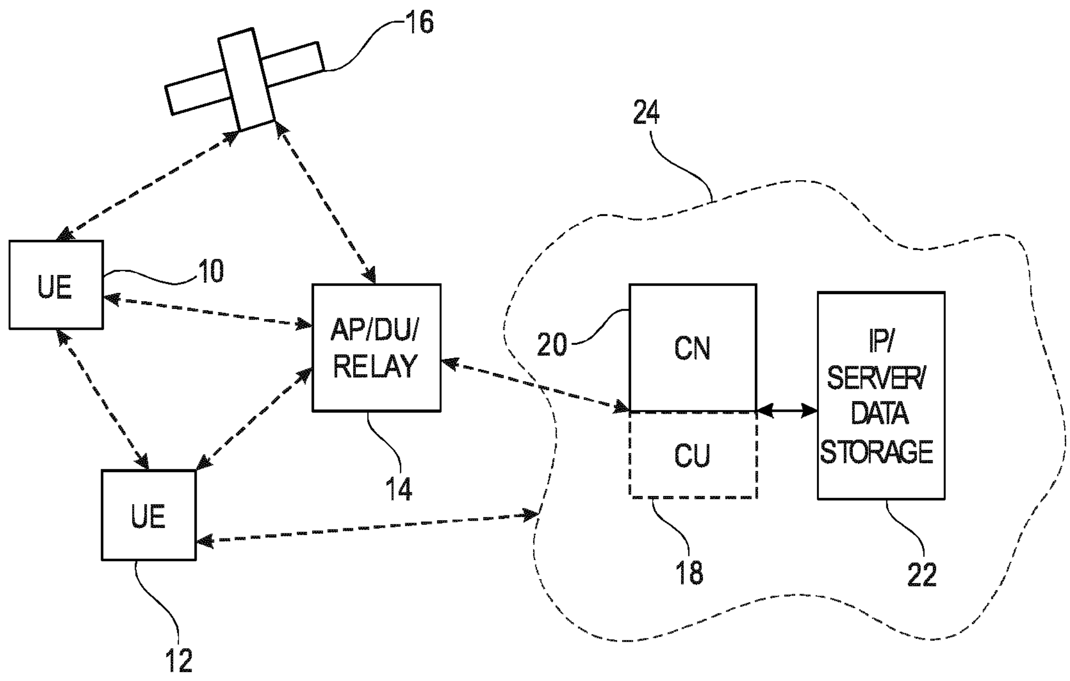
FIG. 1 illustrates a part of an exemplifying radio access network.

In the following description, for purposes of explanation and not limitation, specific details are set forth such as particular architectures, interfaces, techniques, etc., in order to provide a thorough understanding of the examples. However, it will be apparent to those skilled in the art that the disclosed subject matter may be practiced in other illustrative examples that depart from these specific details. In some instances, detailed descriptions of well-known devices and/or methods are omitted so as not to obscure the description with unnecessary detail.

A communication system may be provided. The communication system comprises one or more base stations, wherein each cell of the base stations serves user equipments (UEs) located within the cell. A serving cell of a user equipment is a cell that serves the user equipment. The cell serves the user equipment means that the cell belongs to (or covered by) a base station that serves the user equipment. The communication system may support on or more radio access technologies (RATs). A radio access technology of the radio access technologies may, for example, be evolved universal terrestrial radio access (E-UTRA) or 5G new radio (NR), but it is not limited to, as a person skilled in the art may apply the present subject matter to other communication systems provided with necessary properties. The communication system may enable data communication between base stations and the user equipments using a radio interface protocol. The radio interface protocol may comprise a user plane protocol, used for the transfer of user data (e.g., IP packets) between the base station and the user equipment, and a control plane protocol that is used for control signaling between the base station and the user equipment. The use equipment may be configured to transmit data in accordance with the radio interface protocol. Layers of the radio interface protocol may be classified into a first layer (L1), a second layer (L2), and a third layer (L3) based on the lower three layers of the open system interconnection (OSI) model. The transport blocks are received in accordance with the second layer and the third layer of the protocol. A physical layer belongs to the first layer L1. The physical layer provides a higher layer with an information transfer service through physical channels. The physical layer provides its services to a medium access control (MAC) layer via transport channels. The MAC layer belongs to the second layer L2.

The time-frequency resources of the communication system may be used for carrying information. These resources may be termed physical channels. The physical channels may be specified for uplink and downlink transmission of data. The physical channels may, for example, comprise a physical uplink shared channel (PUSCH), physical downlink control channel (PDCCH), physical random access channel (PRACH) etc. For example, the available time and frequency resources, in the communication system, may be used in accordance with a multi-user configuration by dividing them into parts and sharing the parts amongst many users. The multi-user configuration may need a time and frequency synchronization between users and the base station. The synchronization may, for example, enable the user equipment to exchange user data with the base station. The synchronization may, for example, comprise an uplink time synchronization that enables the user equipment to perform uplink transmissions to the base station. The user equipment may establish the uplink time synchronization if it has not yet acquired, or has lost, its uplink synchronization. For example, the user equipment may establish the uplink synchronization if the user equipment is transiting from an inactive state (inactive state of connection) to a connected state. For example, the user equipment may be configured to perform an uplink synchronization procedure in order to establish the uplink time synchronization. The uplink synchronization procedure may, for example, be part of a random access procedure of LTE or 5G NR system.

The user equipment may be configured to exchange data with the base station depending on its connection status. A user equipment that may be served by the base station may have a connection status indicative of a state of connection of the user equipment to the base station. The state of the connection may, for example, be an idle state or connected state or inactive state. The user equipment being in a connected state means that the user equipment is connected to the base station and can exchange data with the base station. The user equipment being in an idle state means that the user equipment is not connected to the base station. The user equipment being in an inactive state means that the user equipment is connected to the base station but the connection is suspended. The idle state may, for example, be a radio resource control (RRC) IDLE state (RRC-IDLE). The connected state may, for example, be an RRC-CONNECTED state. The inactive state may, for example, be an RRC-INACTIVE state.

Before transiting to the inactive state and while being in the connected state, the user equipment may be served by a cell (e.g., named cell1) of the base station BS1. While the connection is being suspended, the user equipment may be served by a cell (named cell2) of the base station BS2 and may transmit data (named uplink data). The cell cell2 may or may not be the cell cell1 (i.e., BS1 may or may not be BS2). During transition to the inactive state, the base station BS1 may notify the user equipment that the connection is suspended, e.g., via RRC signaling, and store the user equipment context (UE context). The UE context may comprise information on the user equipment based on its state in the communication system. The UE context may, for example, comprise an identifier allocated by the network (e.g., allocated by the base station) to the user equipment in inactive and connected states. Once the UE context has been stored, the UE context may, for example, be used by a base station of the communication system to resume the suspended connection, so that the user equipment can transition from the inactive state to the connected state. For that, the UE context may be identified by the base station of the communication system using an identity of the user equipment, already stored in the UE context. The identity of the user equipment may be sent by the user equipment to said base station. The identity may be of a first type or a second type. The identity of the first type may be referred to as the first identity. The identity of the second type may be referred to as the second identity. The identity of the first type may be used to identify the user equipment. The identity of the second type may be used to identify both the user equipment and the base station which hosts the UE context of the user equipment. The identity may be an identification number which is n-bits wide, where n is an integer number.

The transmission of the uplink (UL) data may be referred to as small data transmission (SDT). The formed data packet that comprises the uplink data may be referred to as SDT packet. The uplink data occupies the payload (named SDT payload) of the SDT packet. The first identity may be referred to as SDT-I-RNTI, where I-RNTI stands for inactive radio network temporary identifier.

The present subject matter may enable data transmission while the user equipment is in the inactive state. The user equipment may send small amounts of data frequently without having to regularly perform idle-connected-idle transitions. However, these small data transmissions may consume large identifiers while requiring low bandwidth. The present subject matter may further be advantageous as it may enable a reduction of overhead for these small data transmissions. In particular, the present subject matter may minimize the overhead associated with small data where the number of identity bits needed to access the UE context can be optimized based on whether the serving cell cell2 in the inactive state is the same as the serving cell cell1 in the connected state (i.e., whether the serving BS1 in the connected state is the serving BS2 in the inactive state). For example, if the user equipment has transitioned to the inactive state while still being in the same cell (i.e., cell2 is cell1), then the data transmitted may be reduced by sending to the base station BS1 only one identifier of the user equipment. For example, the number of bits indicating an identity of the UE sending a payload in an UL SDT or an uplink early data transmission (UL EDT) may be reduced, where the reduced identity may be included only in scenarios where this reduction is applicable. The present subject matter may provide a new short identity specific to SDT which can be used only in case the UL SDT happens in the same cell (i.e., cell2 is cell1). This new identity may be optimized in size down to e.g., 16 bits by not including identification information of the base station. Moreover, this reduced size can also be made configurable to a lower/higher value than 16 bits depending on the number of stationary devices to be served. This may enable the assignment of new short identities for same-cell SDT having a flexible number of bits.

Hence, the user equipment according to the present subject matter may be configured to provide different types of identities for the user equipment depending on whether the user equipment is in the same last serving cell as in its connected state. For example, the identity for the user equipment that did not change the serving cell may be smaller in size compared to the identity of the user equipment that changed the serving cell. Indeed, if a user equipment stays on the same serving cell, the serving base station of the serving cell may not need to establish a new UE context and can use a previously stored one. For that, the base station may only need the identifier of the user equipment in order to identify the UE context. However, if the user equipment has changed the serving cell, the base station may need to establish the UE context and for that it may need the identifier of the base station where the UE context is stored in addition to the identifier of the user equipment. For example, if the user equipment is in the same serving cell as in its connected state, the user equipment may create a data packet that comprises the uplink data and the first identity, wherein the first identity comprises an identifier of the user equipment; otherwise, it may create a data packet that comprises the uplink data and the second identity, wherein the second identity comprises the identifier of the user equipment and an identifier of a last serving base station. The last serving base station is the base station that served the user equipment in its connected state in the last serving cell before it transitioned to the inactive state.

According to an example, the condition further requires that a frequency of cell change and/or a frequency of beam change by the user equipment is smaller than a predefined threshold. Indeed, while the connection is being suspended, the user equipment may move from the cell cell2 to another cell. For example, the mobility history of the user equipment may indicate that the user equipment has not performed any cell changes in an amount of time pre-defined in specifications or configured by the communication system. This example may ensure that the radio conditions are taken into account while employing the first identity. That is, the first identity may only be provided if the two conditions are fulfilled, namely the user equipment did not change the serving cell and has a low mobility. This may enable to send the first identities to those user equipments which may use it because a user equipment that moves too often may change the cell between the time it created the data packet and the time of transmitting the data packet and thus may not make use of the first identity.

According to an example, the means of the user equipment is configured to transmit data in accordance with a radio interface protocol, wherein the condition further requires that a size of a data packet formed with the uplink data and the second identity is larger than a size of a transport block defined for data transmission in the inactive state according to the radio interface protocol, wherein the difference between the size of the data packet and the size of the transport block is smaller than a maximum difference size. This may be advantageous as it may only change the existing identity if the transport block size changes. This may enable a new behavior of the user equipment for cases when a first transport block size is exceeded by a small number of bits, then the present method may be used to select appropriately the UE identity (among the configured identities having different lengths) to reduce the number of identity bits so that the payload and header can fit in the first transport block (TB) size, instead of choosing a next larger TB size.

According to an example, the uplink data has a size smaller than a predefined maximum size. For example, the maximum size may be 1000 bits. This may enable to transmit small data.

According to an example, the inactive state is a radio resource control (RRC) inactive state, wherein the data packet further comprises an RRC message. This may enable seamless integration of the present subject matter using existing control signaling to submit the new identities. For example, the data packet may be part of a Dedicated Traffic Channel (DTCH) Service Data Unit (SDU) that is multiplexed with a Common Control Channel (CCCH) SDU in the MAC Protocol Data Unit (PDU), wherein the CCCH SDU comprises the RRC message.

According to an example, the inactive state is a RRC inactive state. The data packet excludes RRC messages. This may be referred to as RRC less approach because it does not use RRC signaling to transmit the uplink data.

According to an example, the means of the user equipment is configured for receiving before forming the data packet, from the last serving base station the first identity and the second identity. These identities may be received as part of a RRC connection release message from the base station. The base station according to the present subject matter may configure the user equipment with the first and second identities when the user equipment is transiting into the inactive state. For that, the base station may determine whether the frequency of cell change by the user equipment is lesser than the predefined threshold. In response to determining that the frequency of cell change is lesser than the predefined threshold, the first identity may be created by the base station. The second identity may further be created by the base station. That is, if the frequency of cell change is higher than the predefined threshold, the base station may provide the second identity without providing the first identity.

The base station may configure a set of stationary user equipments of the communication system as described above with their respective first and second identities. The first identity may comprise a number of bits sufficient to uniquely identify the set of stationary user equipments.

Upon receiving a data packet from a user equipment (e.g., of the set of stationary user equipments), the base station may determine the type of the identity comprised in the data packet and may identify the UE context based on the type of the identity. For example, in response to determining that the received identity is of the first type, the base station may use the identity for identifying the UE context associated (locally) with the user equipment in the base station. However, if the received identity is of the second type, the base station may use the identity to identify the base station in which the UE context is stored and to identify the UE context in said base station.

The base station may comprise a multi-antenna system. The multi-antenna system may comprise one or more arrays of antenna elements. The array may be a collection of multiple antenna elements arranged in a matrix of rows and columns or some other pattern. The multi-antenna system may be used to perform the beamforming. The beamforming may be a signal processing technique that may be used at the base station to add together radiation patterns of each of the antenna elements in an array in such a way that they concentrate the energy into a narrow beam or lobe. Beamforming may be achieved by combining the signals communicated via antenna elements of an antenna array such that some of the signals experience constructive interference while others experience destructive interference. To create the desired constructive/destructive interference, the base station may apply amplitude and/or phase offsets to signals transmitted from each of the antenna elements of the antenna array. The base station may thus be configured according to the present subject matter to use the beamforming technique to generate a set of one or more beams for the identities to be transmitted in the set of beams. The set of beams may be referred to as transmit (TX) beams. The identities may be received at the user equipment via the receive (RX) beams that correspond to the transmit beams of the base station e.g., the TX beam of the base station on which data is transmitted may be the RX beam of the user equipment on which said data is received at the user equipment. Each beam may correspond to the direction of reception associated to the direction of transmission.

Hence, according to an example, the means of the user equipment is configured for receiving, before forming the data packet, from the last serving base station, the first and second identities via one or more beams, wherein at least one of the received first identity and the received second identity comprises information indicative of the beam on which it was transmitted or received. The first identity of the formed data packet is the received first identity excluding the beam identifier if the user equipment is attempting data transmission from the same beam on which it received the first identity. For example, the first identity may be received via a first beam and the second identity may be received by a second beam, wherein the second beam may be the same as the first beam. The information indicative of the beam may, for example, comprise an identifier of the beam.

The base station may, for example, be provided as a 5G base station comprising a control plane centralized unit (CU-CP), a user plane centralized unit (CU-UP) and a distributed unit (DU). The present subject matter may enable to configure the units of the base station (e.g., as described with reference to FIG. 6) in order to enable small data transmission in the inactive state.

FIG. 1 depicts example of simplified system architecture showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows devices 10 and 12. The devices 10 and 12 may, for example, be user devices. The devices 10 and 12 are configured to be in a wireless connection on one or more communication channels with a node 14. The node 14 is further connected to a core network 20. In one example, the node 14 may be an access node (such as (e/g)NodeB) 14 providing or serving devices in a cell. In one example, the node 14 may be a non-3GPP access node. The physical link from a device to a (e/g)NodeB is called uplink or reverse link and the physical link from the (e/g) NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 20 (CN or next generation core NGC). For example, the (e/g)NodeB may connect to an access and mobility management function (AMF) and user plane function (UPF) in the control plane and user plane, respectively. Depending on the system, the counterpart on the CN side can be a serving gateway (S-GW, routing and forwarding user data packets), packet data network gateway (P-GW), for providing connectivity of devices (UEs) to external packet data networks, or mobile management entity (MME), etc.

The device (also called user device, UE, user equipment, user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilize cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities. The device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than an existing LTE system (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave).

One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet as illustrated by the component referenced by reference numeral 22, or utilize services provided by them. The communication network may also be able to support the usage of cloud services, for example at least part of core network operations may be carried out as a cloud service (this is depicted in FIG. 1 by "cloud" 24). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 14) and non-real time functions being carried out in a centralized manner (in a centralized unit, CU 18).

It should also be understood that the distribution of labour between core network operations and base station operations may differ from that of the LTE or even be non-existent. Some other technology advancements probably to be used are Big Data and all-IP, which may change the way networks are being constructed and managed. 5G is being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 16 in the mega-constellation may cover several satellite-enabled network entities that create on-ground cells. The on-ground cells may be created via an on-ground relay node 14 or by a gNB located on-ground or in a satellite.

It is understandable for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. One of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
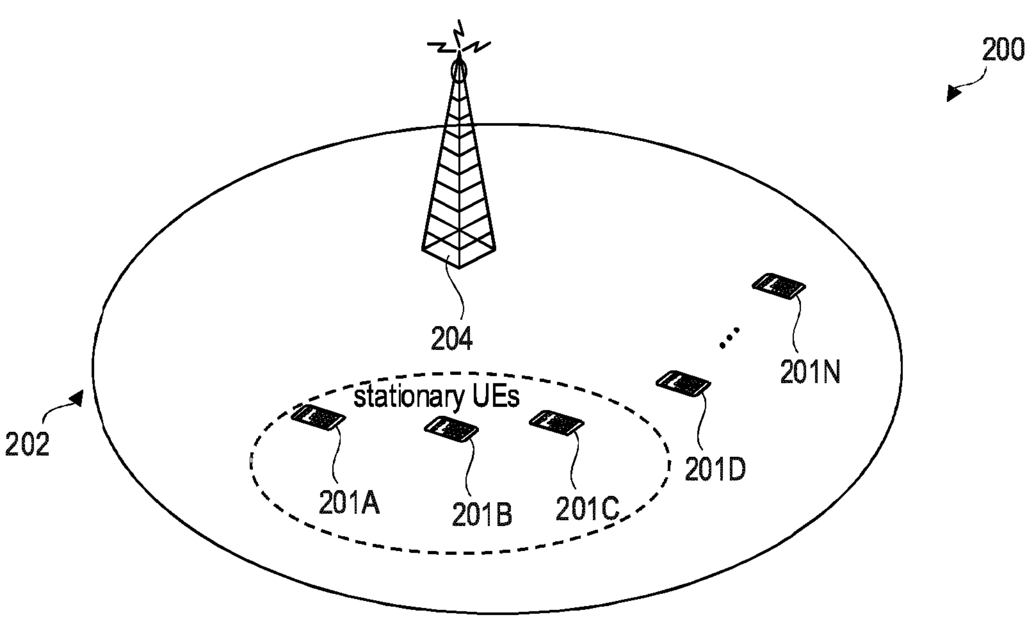
FIG. 2 is a schematic illustration of a communication system.

FIG. 2 is a schematic illustration of a wireless communication system 200. The communication system 200 may, for example, be configured to use a time division duplex (TDD) technique for data transmission.

For simplicity, communication system 200 is shown to include a single base station 204 but it is not limited. The base station 204 may, for example, be eNodeB or gNB e.g., as described with reference to FIG. 1. A cell 202 of the base station 204 may serve UEs 201A through 201N within the cell 202. For simplification of the description, the user equipments may individually be referenced by 201.

The base station 204 may communicate over a transmission medium with the UEs 201A through 201N. The base station 204 may be a base transceiver station (BTS), and may include hardware that enables wireless communication with the UEs 201A through 201N. The base station 204 may facilitate communication between the UEs and/or between the UEs and a network e.g., a core network of a cellular service provider.

The base station 204 may have a fixed number of time and frequency resources e.g., for uplink and/or downlink communication. For example, the base station 204 may have a fixed number of physical resource blocks (PRBs) defined in time and frequency for the uplink communication. The fixed number of resources may be referred to as all the available uplink resources for uplink and/or downlink communication in the cell 202.

Each UE of the UEs 201A through 201N may be configured to communicate using multiple wireless communication standards. For example, the UE might be configured to communicate using a 3GPP cellular communication standard, WLAN, Bluetooth, one or more global navigational satellite systems (GNSS, e.g., GPS or GLONASS), one and/or more mobile television broadcasting standards (e.g., ATSC-M/H or DVB-H), etc.

In this particular example, a set of UEs e.g., 201A through 201C of the UEs 201A through 201N may be stationary UEs.

Figure 3:
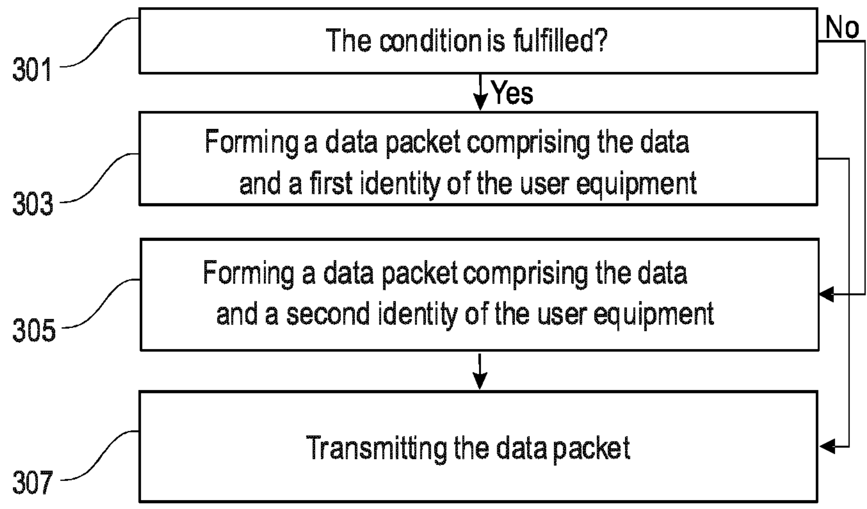
FIG. 3 is a flowchart of a method used in a user equipment according to an example of the present subject matter.

FIG. 3 is a flowchart of a method used in a user equipment according to an example of the present subject matter. For the purpose of explanation, the method may be implemented in the system illustrated in previous FIGS. 1-2, but is not limited to this implementation. The user equipment 201 may, for example, be in inactive state and being served by the cell 202 of the base station 204.

The user equipment 201 may determine (inquiry step 301) whether a condition is fulfilled. The condition requires that the cell 202 was the last serving cell of the user equipment before the user equipment transitioned to the inactive state. In other words, the condition requires that the user equipment is located in the same cell 202 when it was in connected state and inactive state. A cell is referred to as serving cell of a UE if the cell belongs to a given base station that serves the UE.

If the condition is fulfilled, the user equipment may form in step 303 a data packet comprising uplink data and a first identity of the user equipment. The first identity comprises an identifier of the user equipment. The first identity may be of the first type.

If the condition is not fulfilled, the user equipment may form in step 305 a data packet comprising the uplink data and a second identity of the user equipment. The second identity comprises the identifier of the user equipment and an identifier of the last serving base station. The second identity may be of the second type which is different from the first type. The second identity of the second type may, for example, be a Full I-RNTI or a short I-RNTI. Thus, if the condition is not fulfilled the user equipment may choose between the two identities of the second type e.g., depending on radio conditions to ensure transmission success from cell edges.

Figure 7:
FIG. 7 depicts an example content of a transport block.
Figure 7:
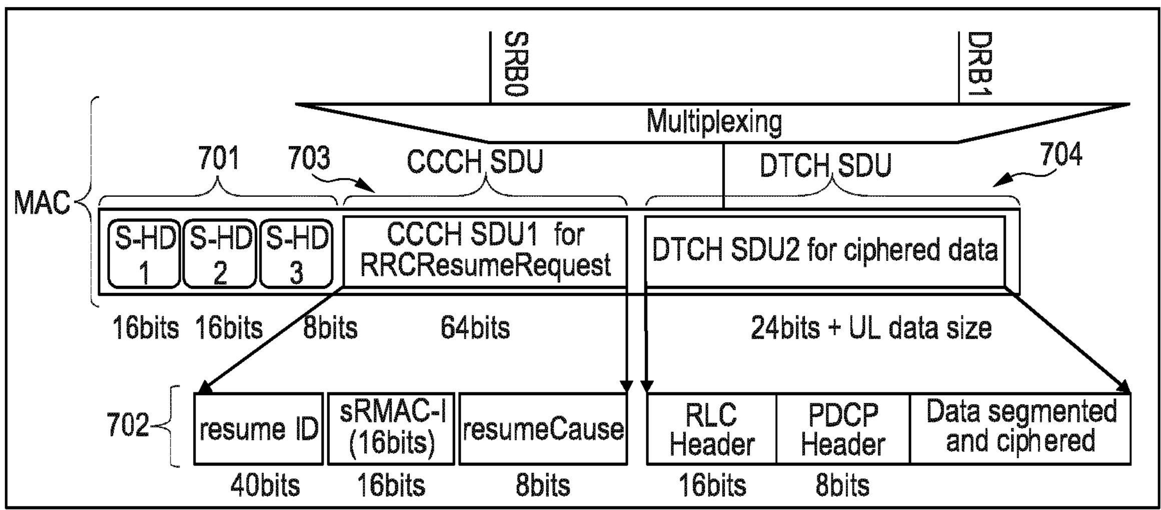

The formed data packet may, for example, be provided as a part of a payload of the MAC PDU e.g., as shown in FIG. 7. The data packet formed with the first identity may be smaller in size compared to the data packet formed with the second identity. Therefore, the MAC PDUs created in accordance with the present method may have a higher probability to fit in provided transport block sizes compared to a method where the data packets are unconditionally formed and systematically contain the second identities. The data packet may, for example, be accompanied with a RRC message. For example, the data packet may be part of a DTCH SDU that is multiplexed with a CCCH SDU in the MAC PDU, wherein the CCCH SDU comprises the RRC message.

Figure 5A:
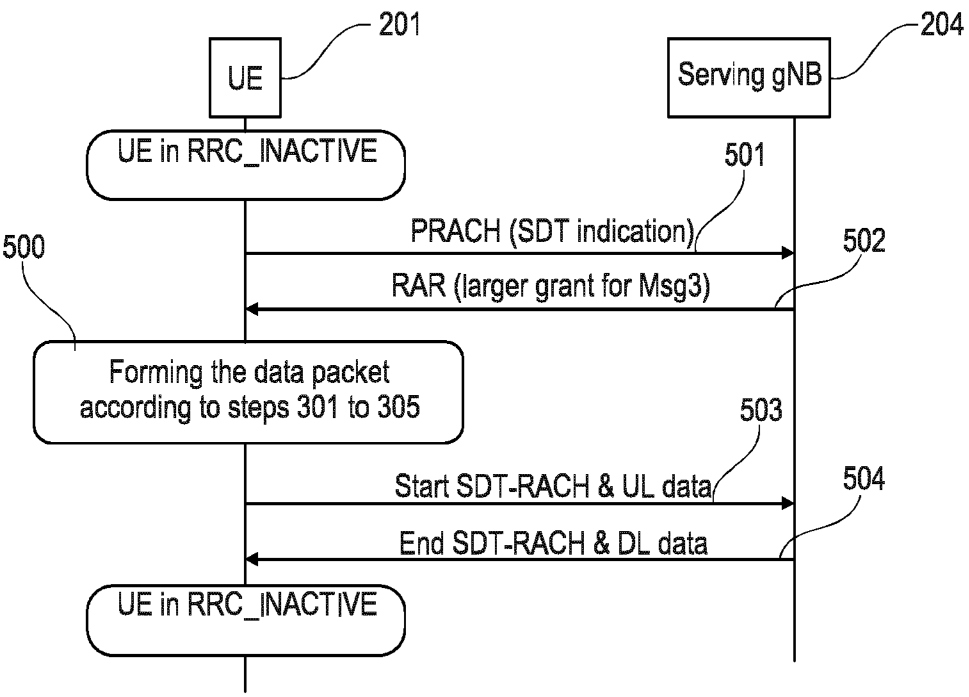
FIG. 5A is a flow diagram of a signaling method between a base station and a user equipment for small data transmission in accordance with an example of the present subject matter.
Figure 5B:
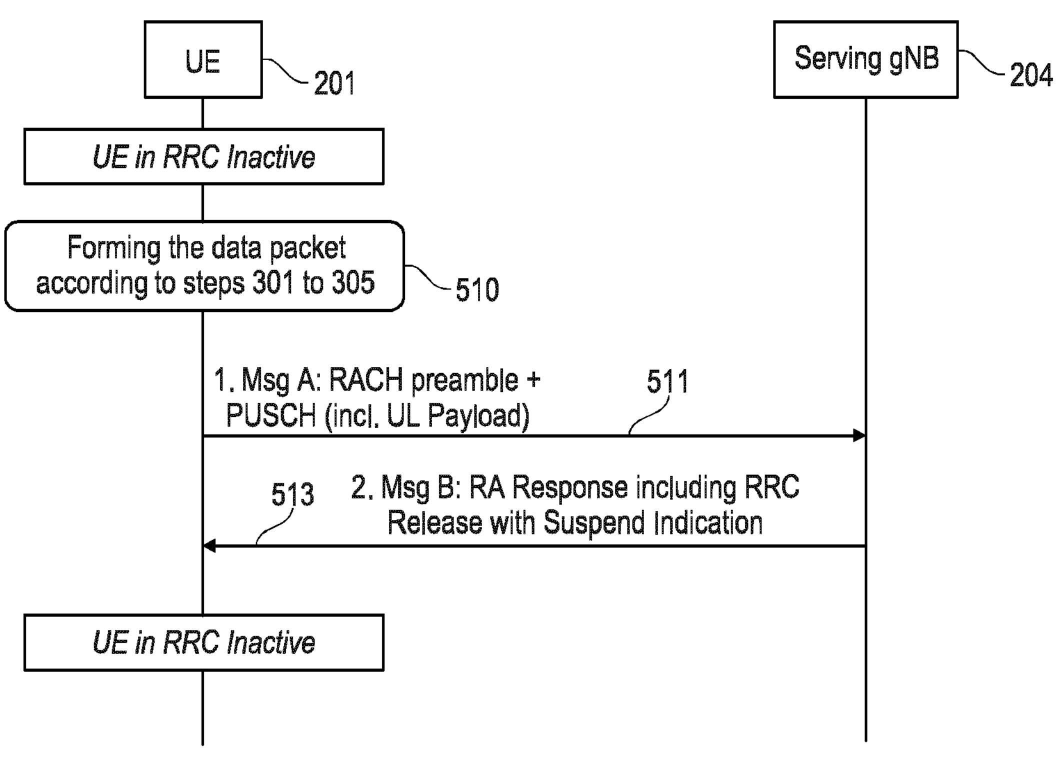
FIG. 5B is a flow diagram of a signaling method between a base station and a user equipment for small data transmission in accordance with an example of the present subject matter.
Figure 5C:
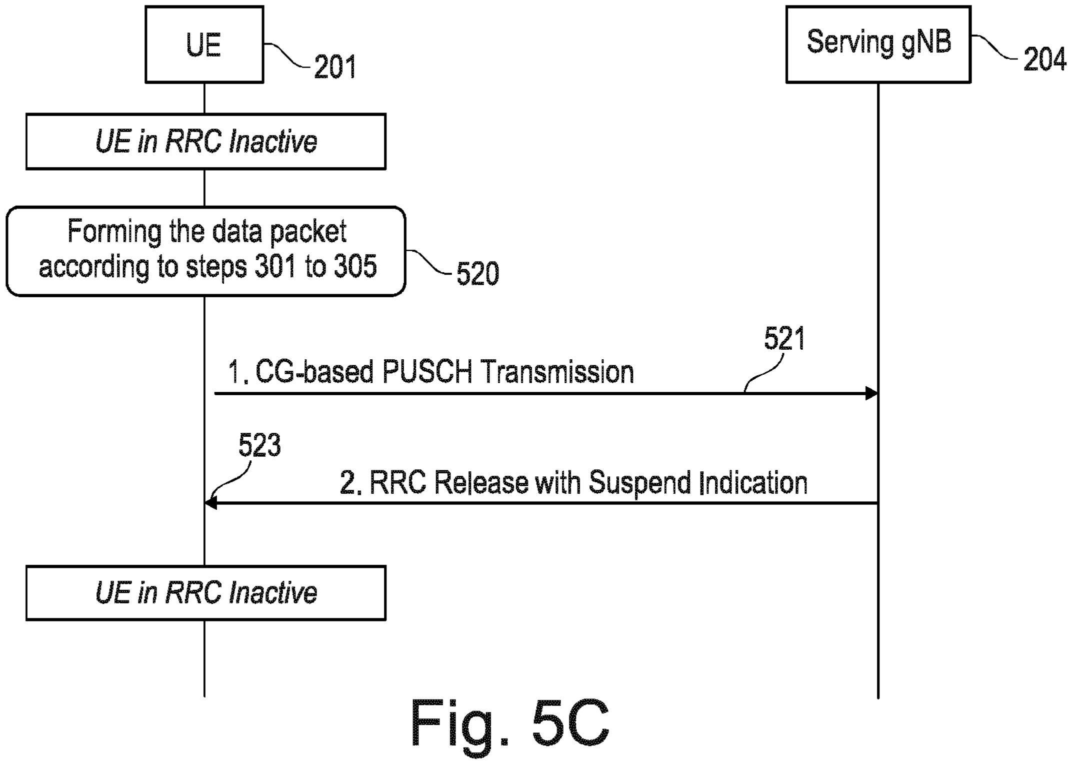
FIG. 5C is a flow diagram of a signaling method between a base station and a user equipment for small data transmission in accordance with an example of the present subject matter.

The user equipment may transmit in step 307 the data packet formed in step 303 or 305 to the base station. FIGS. 5A through 5C provide an example implementation of step 307.

While the condition is still fulfilled e.g., the user equipment is still in the same serving cell and being in the inactive state, the user equipment may transmit one or more further uplink data. Each further uplink data has a size smaller than the predefined maximum size e.g., smaller than 1000 bits. For that, the user equipment may form another data packet as described in step 303 comprising the further uplink data and the first identity. This may be referred to as a multi-shot SDT because multiple transmissions of multiple uplink data packets is performed while the condition is fulfilled.

Figure 4:
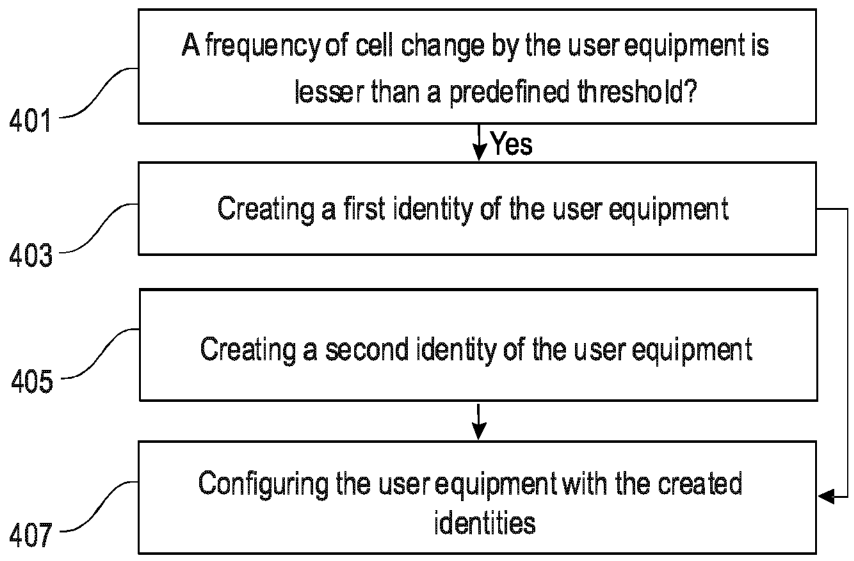
FIG. 4 is a flowchart of a method used in a base station according to an example of the present subject matter.

FIG. 4 is a flowchart of a method used in a base station according to an example of the present subject matter. For the purpose of explanation, the method may be implemented in the system illustrated in previous FIGS. 1-2, but is not limited to this implementation. The method of FIG. 4 may, for example, be performed upon determining by the base station 204 that the user equipment is to enter the inactive state. The UE context of the user equipment may be associated with the identifier of the user equipment in the base station 204.

The base station 204 may determine (inquiry step 401) whether a frequency of cell change by the user equipment is smaller than a predefined threshold.

In response to determining that the frequency of cell change is smaller than the predefined threshold (e.g., for UE 201A), the base station may create in step 403 a first identity of the user equipment, wherein the first identity may comprise an identifier of the user equipment only. The first identity may advantageously be used to identify the UE context of the user equipment in the same base station 204 i.e., if the user equipment is still served by the same cell 202 in the inactive state, then the first identity may be sufficient to identify the UE context. Following the example of FIG. 2, the first identity may comprise a number of bits (e.g., 2 bits) sufficient to uniquely identify the set of three stationary user equipments 201A through 201C.

The base station may create in step 405 a second identity, wherein the second identity comprises the identifier of the user equipment and an identifier of the base station 204. The second identity may advantageously be used to identify the UE context of the user equipment in a base station different the base station 204 i.e., if the user equipment is not served by the same cell 202 in the inactive state, then the second identity may be used by the new base station to establish the UE context from the base station 204.

The base station 204 may configure in step 407 the user equipment with the created identities in order to enable identification of the UE context of the user equipment in the inactive state. The base station 204 may, for example, configure the user equipment via a RRC signaling message such as a RRC connection release message.

FIG. 5A is a flow diagram of a method for transmitting uplink data by a user equipment according to an example of the present subject matter. For the purpose of explanation, the method may be implemented in the system illustrated in previous FIGS. 1-2, but is not limited to this implementation. The method of FIG. 5A provides an example implementation of step 307 of FIG. 3.

The UE 201 may send (501) a first message (e.g., msg1) which may be a randomly selected random access preamble sequence. The first message may be sent during a PRACH opportunity. The gNB 204 may receive the first message and may reply (502) with a second message (e.g., msg2). The second message may comprise a random access response (RAR). The RAR grant may comprise a time and frequency resource allocation for the UE 201. The RAR grant may, for example, comprise a modulation and coding scheme (MCS) and a transmit power control (TPC) command. The UE 201 may monitor a control channel for the second message and decode it. The UE 201 may perform (500) steps 301 to 305 of FIG. 3 in order to create the SDT packet. The UE 201 may send (503) a third message comprising the SDT packet as part of the UL data. The third message may comprise SDT packet multiplexed with the RRC message msg3. The RRC message may be a RRC resume request message. The third message may be sent according to scheduled resources provided in the RAR grant. The gNB 204 may reply (504) with a fourth message (e.g., msg4). The fourth message may be a RRC release message with suspend indications.

FIG. 5B is a flow diagram of a method for transmitting uplink data by a user equipment according to an example of the present subject matter. For the purpose of explanation, the method may be implemented in the system illustrated in previous FIGS. 1-2, but is not limited to this implementation. The method of FIG. 5B provides an example implementation of step 307 of FIG. 3.

FIG. 5B is an example SDT between the UE 201 and the gNB 204 in accordance with a 2-step RACH procedure. The UE 201 may perform (510) steps 301 to 305 of FIG. 3 in order to create the SDT packet. According to the 2-step RACH procedure, the first message msg1 and the third message of FIG. 5A may be sent (511) together in a first transmission (e.g., msgA). The first message and the third message may be time division multiplexed. The third message may be transmitted on a channel such as the PUSCH. In the 2-step RACH procedure, the second message msg2 and the fourth message msg4 may be combined into a second message (e.g., msgB) that is sent (513) by the gNB 204. In the 2-step RACH, the third message may be transmitted before receiving a resource assignment (e.g., grant) from the gNB 204.

FIG. 5C is a flow diagram of a method for transmitting uplink data by a user equipment according to an example of the present subject matter. For the purpose of explanation, the method may be implemented in the system illustrated in previous FIGS. 1-2, but is not limited to this implementation. The method of FIG. 5C provides an example implementation of step 307 of FIG. 3.

The UE 201 may perform (520) steps 301 to 305 of FIG. 3 in order to create the SDT packet. The third message as defined in FIG. 5A may be sent (521) over a configured grant (CG) PUSCH. The gNB 204 may reply (523) with the fourth message (e.g., msg4). The fourth message may be a RRC release message with suspend indications.

Figure 6:
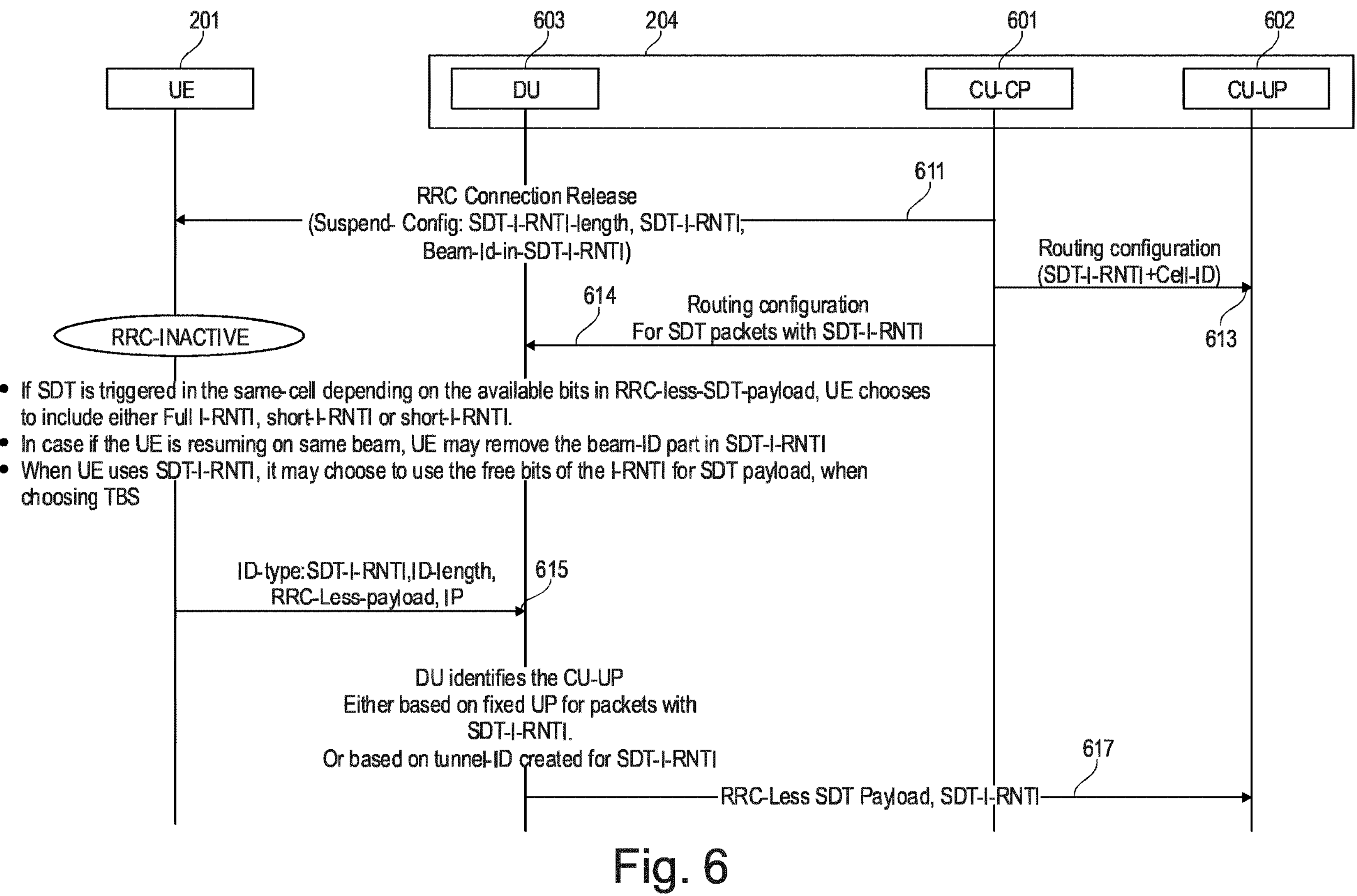
FIG. 6 is a flow diagram of a signaling method between a base station and a user equipment for small data transmission in accordance with an example of the present subject matter.

FIG. 6 is a flow diagram of a signaling method between a base station and a user equipment for small data transmission in accordance with an example of the present subject matter. For the purpose of explanation, the method may be implemented in the system illustrated in previous FIGS. 1-2, but is not limited to this implementation. The base station 204 may, for example, comprise a CU-CP 601, a CU-UP 602 and a DU 603.

As part of F1 and E1 setup procedures, the CU-CP 601 is configured to configure a common default F1-U tunnel per relevant (DU, CU-UP) pair which may be used exclusively for UEs performing SDT in the same cell ("same cell" is the cell that served the UE in connected state and that serves the UE in inactive state). The addressing information such as F1-U UL and DL TEID may be provided to both the default CU-UP and each DU. During F1 setup, an RLC configuration common for all UEs performing same-cell SDT may be provided to the DU 603 by the CU-CP 601. This may further ensure that a DU could be stateless during the entire SDT operation. When there are multiple CU-UPs in a gNB, the default CU-UP may be chosen based on the service/DRB configured for SDT in the UE 201. In the latter case, if the DU 603 is connected to multiple CU-UPs (serving different services), each service in the DU 603 may have a common F1-U tunnel with the corresponding CU-UP. The DU 603 can identify the correct CU-UP using the Logical Channel ID present in the SDT UP PDU.

The CU-CP 601 may configure routing of an SDT packet from the UE 201 at DU while the UE 201 is inactive state. The CU-CP 601 may first send (611) a RRC connection release message to transition the UE 201 from the connected state to the inactive state. The connection release message may comprise the first identity STD-I-RNTI and the length of the first identity. The STD-I-RNTI may comprise a beam ID of the beam on which the first identity is transmitted.

Next, the CU-CP 601 configures (613) the CU-UP with SDT-I-RNTI value and associated cell-ID when the UE 201 is released to RRC-INACTIVE along with a normal I-RNTI and other information it transfers to the CU-UP 602 during release with suspend procedure. The cell-ID is the identifier of the cell that serves the UE 201 in the connected state.

The CU-CP 601 configures (614) the default routing context information for RRC-INACTIVE UEs supporting SDT in the DU (a common F1-U tunnel for all UEs) when releasing the UE to RRC-INACTIVE state. In this case, the CU-CP 601 provides to the DU the SDT-I-RNTI and cell-Id and associated CU-UP identifier for routing the same cell SDT packets.

The DU 603 may receive (615) from the UE 201 an SDT packet. The SDT packet comprises the first identity SDT-I-RNTI and the uplink data. The SDT packet may be transmitted using an RRC message or without using a RRC message. Transmitting the SDT packet using a RRC message may be performed by multiplexing in the MAC PDU assigned to the RRC message, the RRC message and the SDT packet. This may be referred to as RRC-based SDT transmission approach. Transmitting the SDT packet without using a RRC message may be referred to as RRC-less SDT transmission approach.

The DU 603 may identify the correct CU-UP using the received packet e.g., using Logical Channel ID present in the SDT UP PDU. The DU 603 sends (617) the SDT including a packet containing its SDT-I-RNTI to its default CU-UP 602 common tunnel (which was configured during F1 setup). In this case, the DU 603 may not need to maintain the UE context for same cell SDT transmission, even if a multi-shot SDT is being performed for a UE. The DU 603 also sends the received cell-ID information while sending the packet to CU-UP (which includes the SDT-I-RNTI) over the common F1-U tunnel. In case of RRC-based SDT transmission in the same cell, the DU 603 may forward the SDT UP packet to the default CU-UP 602 without waiting for establishment of UE context over F1. In this case, the RRC message may be forwarded to CU-CP 602 in parallel.

On receiving the SDT packet from DU 603 containing the SDT-I-RNTI, the CU-UP 602 may check the presence of the UE context for SDT-I-RNTI and Cell-ID combination. If not available, it may fetch this information along with security keys information from CU-CP and process the received packet. A new E1 procedure may be used to fetch the UE context, by providing SDT-I-RNTI and Cell ID information. This is then stored for subsequent UL SDT transmissions.

In the following a detailed example radio interface signalling procedure in 5G for flexible short identity for same-cell SDT is provided:

- The gNB 204 configures a new identity denoted SDT-I-RNTI of e.g., 16 bits length which the UE 201 can use for SDT transmissions from the same cell (i.e., on which the UE 201 was moved to RRC-INACTIVE).
  - The gNB 204 may configure this identity only to selected UE(s), which are stationary or low mobility UE(s), i.e., UE's mobility history indicates that it has not performed any cell changes in an amount of time pre-defined in specifications or configured by the network. This ensures that the radio conditions are taken into account while employing an SDT-I-RNTI. The length of this identity can also be configurable to a lower value than 16 bits depending on the number of stationary devices to be served (and that should be discriminated) by the cell/beam.
  - Alternatively, a UE 201 which is assigned an SDT-I-RNTI may use it only when it is performing SDT from the same cell.
  - The gNB 204 may also indicate that the SDT-I-RNTI can be a combination of two parts.
    - The first part corresponds to the beam on which the RRC connection was released and
    - The second part corresponds to the UE identity. In this case, if the UE is resuming on the same beam and using an associated RACH resource, the UE can reduce the UE identity size by sending the SDT-I-RNTI without the bits related to the beam part.
  - If the serving cell supports multiple beams (e.g., 32 beams, one per SSB), and if the UE is stationary and hence the beam coverage is not changing, the same SDT-RNTI can be reused across beams. This may provide some benefits in the DU since beam change could be avoided. In this case if the beam-Id is the included in SDT-I-RNTI, the UE can exclude the beam-ID part when initiating SDT in the same beam.
- When the UE initiates the SDT transmission from the same cell where it was released to RRC-INACTIVE, depending on the available bits after SDT payload to match the smallest TBS size, the UE may choose to populate the UE ID field (e.g., in the RRC Resume Request or alike message) with either I-RNTI/Short I-RNTI or SDT-I-RNTI. This selection would typically be also coupled with the radio conditions experienced by the UE in the cell (RSRP measured by the UE).

FIG. 7 is a diagram showing an example content of the MAC PDU 700. The MAC PDU 700 may form one transport block. The MAC PDU 700 may, for example, be used to perform the UL transmission of the data packet as described in step 303, 503, 511 or 521. The MAC PDU 700 comprises a header 701 and a MAC payload 702. The MAC payload 702 may comprise at least the data packet formed according to the present subject matter. As shown in FIG. 7, the data packet may be accompanied with a RRC message. For example, the data packet may be part of a DTCH SDU 704 that is multiplexed with a CCCH SDU 703 in the MAC PDU 700, wherein the CCCH SDU 703 comprises the RRC message. The term "UL data size" in FIG. 7 refers to the size of the data packet namely the size of the uplink data plus the size of the identity included in the data packet.

Alternatively, the data packet may not be accompanied with RRC data; that is, the MAC payload 702 may comprise the data packet only e.g., the MAC payload may comprise the DTCH SDU 704 only. This may, for example, advantageously be used by the user equipment when sending further uplink data while the user equipment is still in the same serving cell and in the inactive state. In other words, the transport block of subsequent UL transmissions within the same SDT procedure may omit the CCCH part (e.g., the RRC message may be provided only in the first UL SDT transmission and may be skipped in the subsequent UL transmissions.

The size of the transport block may, for example, be a predefined TB size. The size of the transport block may, for example, be selected from multiple predefined TB sizes. The network (e.g., the gNB 204) may define the multiple TB sizes for the transmission of the data packets formed according to the present subject matter. For example, for the RRC-based SDT transmission approach, up to two PRACH preamble groups may be configured by the network, which may correspond to two different transport block sizes (and UL payload sizes) for MSGA/MSG3.

Figure 8:
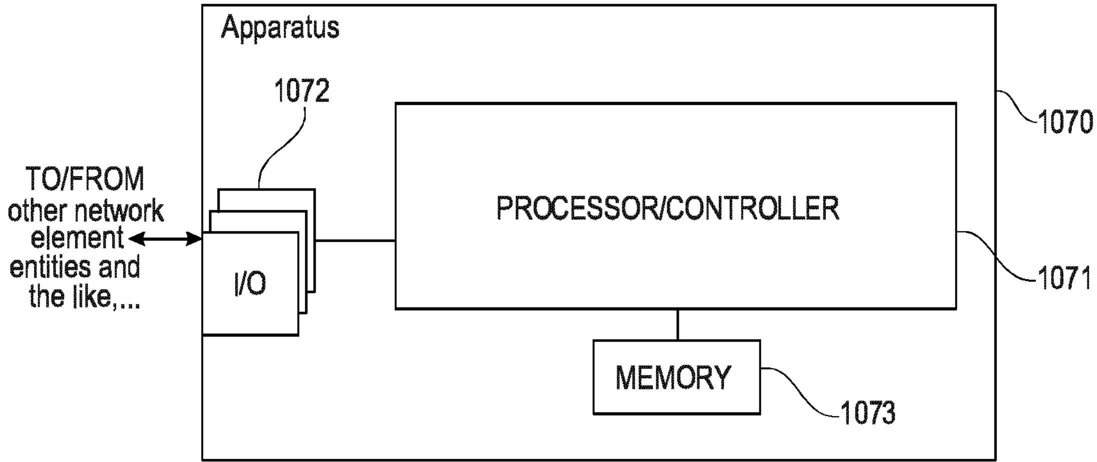
FIG. 8 is a block diagram showing an example of an apparatus according to an example of the present subject matter.

In FIG. 8, a block circuit diagram illustrating a configuration of an apparatus 1070 is shown, which is configured to implement at least part of the present subject matter. It is to be noted that the apparatus 1070 shown in FIG. 8 may comprise several further elements or functions besides those described herein below, which are omitted herein for the sake of simplicity as they are not essential for the understanding. Furthermore, the apparatus may be also another device having a similar function, such as a chipset, a chip, a module etc., which can also be part of an apparatus or attached as a separate element to the apparatus 1070, or the like. The apparatus 1070 may comprise a processing function or processor 1071, such as a central processing unit (CPU) or the like, which executes instructions given by programs or the like related to a flow control mechanism. The processor 1071 may comprise one or more processing portions dedicated to specific processing as described below, or the processing may be run in a single processor. Portions for executing such specific processing may be also provided as discrete elements or within one or more further processors or processing portions, such as in one physical processor like a CPU or in several physical entities, for example. Reference sign 1072 denotes transceiver or input/output (I/O) units (interfaces) connected to the processor 1071. The I/O units 1072 may be used for communicating with one or more other network elements, entities, terminals or the like. The I/O units 1072 may be a combined unit comprising communication equipment towards several network elements or may comprise a distributed structure with a plurality of different interfaces for different network elements. Reference sign 1073 denotes a memory usable, for example, for storing data and programs to be executed by the processor 1071 and/or as a working storage of the processor 1071.

The processor 1071 is configured to execute processing related to the above described subject matter. In particular, the apparatus 1070 may be configured to perform at least part of the method as described in connection with FIG. 3 or 4.

For example, the processor 1071 is configured for: in response to determining that a condition is fulfilled, forming a data packet comprising uplink data and a first identity of the user equipment; otherwise, forming a data packet comprising the uplink data and a second identity of the user equipment, wherein the condition requires that the cell was a last serving cell of the user equipment before the user equipment transitioned to the inactive state; wherein the first identity is different from the second identity; transmitting the data packet to the base station.

For example, the processor 1071 is configured for: determining whether a frequency of cell change by a user equipment is lesser than a predefined threshold, in response to determining that the frequency of cell change is lesser than the predefined threshold, creating a first identity, wherein the first identity comprises an identifier of the user equipment which uniquely identifies the UE in the cell currently serving the UE; creating a second identity, wherein the second identity comprises an identifier of the user equipment and an identifier of the base station (or of an element of the base station (e.g. Control Unit User Plane entity)); configuring the user equipment with the created identities to be used for data transmission in inactive state, in order to enable identification of a user equipment context of the user equipment in inactive state of connection.

As will be appreciated by person skilled in art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable storage medium. A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

'Computer memory' or 'memory' is an example of a computer-readable storage medium. Computer memory is any memory which is directly accessible to a processor. 'Computer storage' or 'storage' is a further example of a computer-readable storage medium. Computer storage is any non-volatile computer-readable storage medium. In some embodiments computer storage may also be computer memory or vice versa.

A 'processor' as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances the computer executable code may be in the form of a high level language or in a pre-compiled form and be used in conjunction with an interpreter which generates the machine executable instructions on the fly.

Generally, the program instructions can be executed on one processor or on several processors. In the case of multiple processors, they can be distributed over several different entities. Each processor could execute a portion of the instructions intended for that entity. Thus, when referring to a system or process involving multiple entities, the computer program or program instructions are understood to be adapted to be executed by a processor associated or related to the respective entity.

The invention claimed is:

1. A user equipment, comprising:

at least one processor; and at least one memory including computer program code, the at least one memory and the computer program code being configured to, with the at least one processor, cause the user equipment to perform:

in response to determining that a condition is fulfilled, forming a data packet comprising the data and a first identity of the user equipment; otherwise, forming the data packet comprising the data and a second identity of the user equipment; wherein the condition comprises at least that a cell was a last serving cell of the user equipment before the user equipment transitioned to an inactive state; wherein the first identity is different from the second identity;

transmitting the data packet to a base station, wherein the at least one memory and the computer program code being configured to, with the at least one processor, cause the user equipment to transmit data in accordance with a radio interface protocol, wherein the condition further comprises that a size of the data packet formed with the data and the second identity is larger than a size of a transport block defined for data transmission in the inactive state according to the radio interface protocol, wherein the difference between the size of the data packet and the size of the transport block is smaller than a maximum difference size.

2. The user equipment of claim 1, wherein the first identity comprises an identifier of the user equipment, the second identity comprises the identifier of the user equipment and an identifier of a last serving base station of the last serving cell.

3. The user equipment of claim 1, wherein the condition further comprises that a frequency of cell change and/or a frequency of beam change by the user equipment is smaller than a predefined threshold.

4. The user equipment of claim 1, wherein the at least one memory and the computer program code being configured to, with the at least one processor, cause the user equipment to perform: receiving, before forming the data packet, from the last serving base station the first identity and the second identity.

5. The user equipment of claim 1, wherein the at least one memory and the computer program code being configured to, with the at least one processor, cause the user equipment to perform: receiving, before forming the data packet, from the last serving base station the first and second identities in one or more beams, wherein each identity of the received first identity and the received second identity comprises information indicative of the beam on which it is received, wherein the first identity of the formed data packet is the received first identity excluding the beam identifier if the user equipment is attempting data transmission from the same beam on which it received the first identity.

6. The user equipment of claim 1, wherein the data has a size smaller than a predefined maximum size.

7. The user equipment of claim 1, wherein the inactive state is a radio resource control (RRC) inactive state, wherein the data packet further comprises a RRC message.

8. The user equipment of claim 1, wherein the inactive state is a RRC inactive state, wherein the data packet excludes RRC messages.

9. A method, comprising:

in response to determining that a condition is fulfilled, forming a data packet comprising the data and a first identity of the user equipment; otherwise, forming the data packet comprising the data and a second identity of the user equipment;

wherein the condition comprises at least that the cell was a last serving cell of the user equipment before the user equipment transitioned to the inactive state; wherein the first identity is different from the second identity;

transmitting the data packet to the base station, wherein the method further comprises:

transmitting data in accordance with a radio interface protocol, wherein the condition further comprises that a size of the data packet formed with the data and the second identity is larger than a size of a transport block defined for data transmission in the inactive state according to the radio interface protocol, wherein the difference between the size of the data packet and the size of the transport block is smaller than a maximum difference size.

10. A user equipment, comprising:

at least one processor; and at least one memory including computer program code, the at least one memory and the computer program code being configured to, with the at least one processor, cause the user equipment to perform:

in response to determining that a condition is fulfilled, forming a data packet comprising the data and a first identity of the user equipment; otherwise, forming the data packet comprising the data and a second identity of the user equipment; wherein the condition comprises at least that a cell was a last serving cell of the user equipment before the user equipment transitioned to an inactive state; wherein the first identity is different from the second identity;

transmitting the data packet to a base station, wherein the at least one memory and the computer program code being configured to, with the at least one processor, cause the user equipment to perform: receiving, before forming the data packet, from the last serving base station the first and second identities in one or more beams, wherein each identity of the received first identity and the received second identity comprises information indicative of the beam on which it is received, wherein the first identity of the formed data packet is the received first identity excluding the beam identifier if the user equipment is attempting data transmission from the same beam on which it received the first identity.

* * * * *